Aug. 22, 1939.  E. F. BURTON  2,170,545
REPLACEABLE SHAFT SURFACING BEARING ELEMENT
Filed Nov. 22, 1937
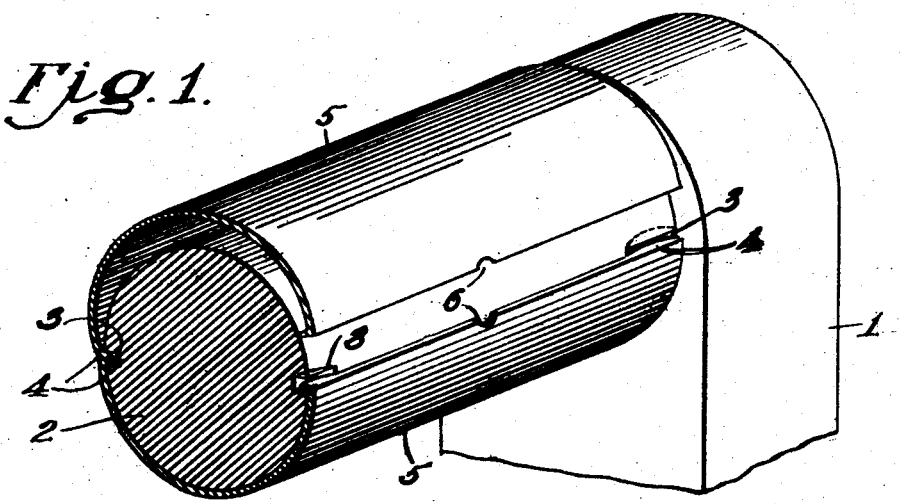
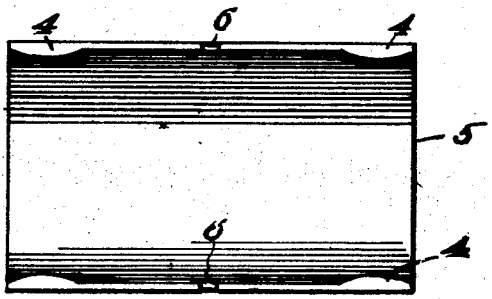
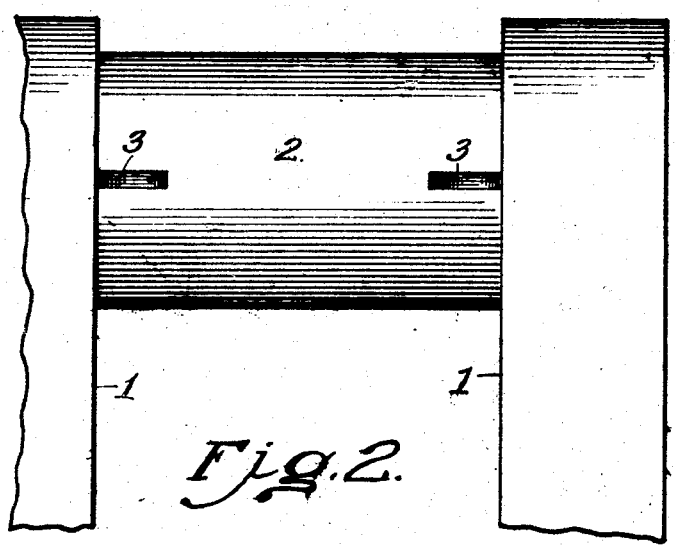
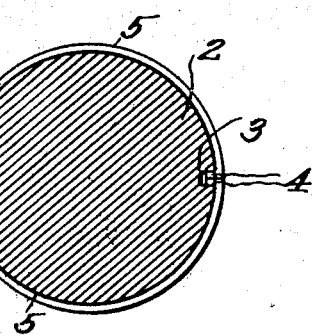
Inventor
E. F. Burton
By Thorpe & Thorpe
Attorneys Patented Aug. 22, 1939

2,170,545

UNITED STATES PATENT OFFICE 2,170,545

REPLACEABLE SHAFT SURFACING BEARING ELEMENT

Edgar F. Burton, Kansas City, Kans., assignor, by direct and mesne assignments, of one-third to Edward J. Marcus, Kansas City, Kans., and John H. Meik, Kansas City, Mo., one-fifth to John F. Riley, four and two-thirds per cent to T. J. Riley, four and two-thirds per cent to Amanda Catherine Riley, four and two-thirds per cent to Henry B. Riley, four and one-half per cent to J. P. Jonz, four and one-half per cent to Geo. E. Ford and two per cent to G. C. McDermett, all of Wichita Falls, Tex., and five per cent to F. C. Key, Wichita County, Tex.

Application November 22, 1937, Serial No. 175,758

4 Claims. (Cl. 308—237)

This invention relates to bearing surface elements and is particularly designed for the surfacing of crank shaft bearings where it is impossible to slip a bushing or the like longitudinally of the shaft bearing. The general object of the invention is to lessen the cost of repairs on trucks and automobiles due to burned-out bearings. At present when the bearing surface of connecting rods overheats and burns out, the crank shaft bearing surface is usually scored or scratched, necessitating the removal of the crank shaft for repairs. With the device of the invention this expensive repair work will be entirely eliminated, since it will be only necessary to replace a small inexpensive bearing element without taking the crank shaft from position. The device, of course, is applicable to other shaft bearings also. A further advantage of the device of the invention is the fact that the bearing will run cooler than ordinary bearings since there will be a film of oil on both of its sides.

Another object of the invention is to produce a device of the character set forth which is of strong, durable, efficient and inexpensive construction; and in order that it may be fully understood, reference is to be had to the accompanying drawing, in which:

Figure 1 is a perspective view of a crank bearing with one of the crank arms omitted, showing one bearing surface element on the bearing, and the other element in process of application.

Figure 2 is a plan view of a crank bearing showing one method of applying the milled recesses in which certain locking tongues or ears of the surfacing element are interlocked against rotation or longitudinal movement.

Figure 3 is an end view of the bearing as shown in Figure 1.

Figure 4 is a side elevation of one of the bearing surface elements.

In the said drawing, where like reference characters identify corresponding parts in all of the figures, 1 represents a pair of crank arms connected by a crank or bearing portion 2. The bearing is of the desired diameter, and one or more slots 3 are milled at diametrically opposite sides of the crank. The slots or recesses 3 are so spaced as to receive inwardly extending ears 4 formed on the opposite edges of semi-circular bearing surface elements 5, of such diameter and resiliency as to be snapped into position as shown in Figure 1, it being understood that in the process of manufacture, the devices will be made in pairs and will be ground on an arbor to bring them down to the desired diameter.

For convenience in removing the surface elements they are preferably formed with notches 6 into which a tool can be engaged to snap a bearing member out of position. It will be noted that the engagement of the ears in the slots in the crank will lock the surfacing elements against rotation around the crank and will also hold them against endwise or longitudinal slippage in either direction.

It is to be noted that with a bearing surfacing element embodying the invention, the bearing can be fitted with less clearance than with standard elements, since the surfacing elements will have a film of oil on both their outer and inner surfaces. The bearings will therefore run cooler than standard shaft bearings. It is also to be noted that in the formation of the recesses 3, it is preferred that they be so located that where used in internal combustion engines, the beginning of a power stroke will occur when the connecting rod, not shown, is at such angle that the power stroke starts at about the abutting edges of the bearing members 3. This is particularly important if the crank surfaces 2 are not fully machined, since the shock incident to the explosion in a cylinder, if applied to the middle of a bearing element, might tend to create pressure expanding the surfacing elements.

From the above description it will be apparent that I have produced a device embodying all of the features of advantage set forth as desirable and while I have described and illustrated the preferred embodiment of the invention, it is to be understood that I reserve the right to all changes within the spirit of the invention and without the ambit of the prior art.

I claim:

1. As a new article of manufacture a substantially semi-circular member of resilient material having at its opposite ends, a pair of tongues projecting toward each other, and adapted to interlock with sockets of a shaft.

2. A shaft formed with a pair of sockets, a pair of resilient bearing forming elements encircling the shaft, each of said elements being under constant tension to grip the shaft and having inwardly projecting tongues interlocked with the shaft sockets.

3. A shaft formed with a pair of sockets, a pair of resilient bearing surfacing elements encircling the shaft, each of said elements having inwardly projecting tongues interlocked with the shaft, said members being also formed with recesses to cooperate in the removal of the elements from the shaft.

4. A bearing structure having shaft fitting sections formed with inwardly projecting members adapted for seating within a slot in a crank shaft whereby to secure said sections together about a crank shaft to form a bearing collar therefor.

EDGAR F. BURTON.